(12) United States Patent
Kim

(10) Patent No.: US 9,930,392 B2
(45) Date of Patent: Mar. 27, 2018

(54) APPARATUS FOR DISPLAYING AN IMAGE AND METHOD OF OPERATING THE SAME

(71) Applicant: SAMSUNG ELECTRONICS CO., LTD., Suwon-si (KR)

(72) Inventor: Je-ik Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/203,979

(22) Filed: Jul. 7, 2016

(65) Prior Publication Data

US 2017/0019701 A1    Jan. 19, 2017

(30) Foreign Application Priority Data

Jul. 17, 2015   (KR) ........................ 10-2015-0101989

(51) Int. Cl.
| | |
|---|---|
| *H04N 21/442* | (2011.01) |
| *H04N 21/443* | (2011.01) |
| *H04N 21/422* | (2011.01) |
| *H04N 21/41* | (2011.01) |
| *H04N 21/436* | (2011.01) |

(Continued)

(52) U.S. Cl.
CPC ..... *H04N 21/42204* (2013.01); *G06F 1/3287* (2013.01); *H04L 12/2807* (2013.01); *H04N 21/4126* (2013.01); *H04N 21/4131* (2013.01); *H04N 21/4227* (2013.01); *H04N 21/43615* (2013.01); *H04N 21/4424* (2013.01); *H04N 21/4435* (2013.01); *H04N 21/4436* (2013.01); *H04N 21/44231* (2013.01); *H04W 4/005* (2013.01); *H04L 2012/2849* (2013.01); *H04W 88/02* (2013.01)

(58) Field of Classification Search
CPC ......... H04N 21/44227; H04N 21/4424; H04N 21/4436
USPC ....................................................... 725/151
See application file for complete search history.

(56) References Cited

U.S. PATENT DOCUMENTS

| | | | |
|---|---|---|---|
| 8,941,853 B2 | 1/2015 | Higashi | |
| 9,058,668 B2 | 6/2015 | Plowman et al. | |

(Continued)

FOREIGN PATENT DOCUMENTS

| | | |
|---|---|---|
| KR | 101409066 B1 | 7/2014 |
| WO | 2014148174 A1 | 9/2014 |

OTHER PUBLICATIONS

Communication dated Dec. 6, 2016 issued by European Patent Office in counterpart European Application No. 16 178 411.1.

(Continued)

*Primary Examiner* — Dominic D Saltarelli
(74) *Attorney, Agent, or Firm* — Sughrue Mion, PLLC

(57) ABSTRACT

An apparatus for displaying an image includes a non-volatile memory device configured to store a first program and a second program; and a processor configured to load the first program onto a first area of a volatile memory device to execute the first program in a power-on state of the apparatus, wherein the processor includes a plurality of cores, and in a power-off state of the apparatus, the processor is configured to deactivate at least one of the plurality of cores, deactivate the first program loaded onto the first area, and load the second program onto a second area of the volatile memory device to execute the second program, wherein the first program and the second program, when executed, are configured to cause the processor to receive state information of an external device.

18 Claims, 12 Drawing Sheets

(51) Int. Cl.
　　　*H04L 12/28*　　　(2006.01)
　　　*H04N 21/4227*　(2011.01)
　　　*H04W 4/00*　　　(2018.01)
　　　*G06F 1/32*　　　(2006.01)
　　　*H04W 88/02*　　(2009.01)

(56) References Cited

U.S. PATENT DOCUMENTS

| | | |
|---|---|---|
| 2003/0135771 A1 | 7/2003 | Cupps et al. |
| 2008/0162770 A1 | 7/2008 | Titiano et al. |
| 2010/0323763 A1 | 12/2010 | Englebrecht et al. |
| 2013/0247079 A1 | 9/2013 | Zheng et al. |
| 2015/0163143 A1 | 6/2015 | Larsen et al. |
| 2016/0048199 A1 | 2/2016 | Kuroda et al. |

OTHER PUBLICATIONS

Communication dated Sep. 12, 2016, issued by the International Searching Authority in counterpart International Application No. PCT/KR2016/007306 (PCT/ISA/210 & PCT/ISA/237).

Communication dated Nov. 23, 2016, issued by the European Patent Office in counterpart European Application No. 16178411.1.

Takalo-Mattila Janne et al: "Architecture for mixed criticality resource management in Internet of Things" Proceedings of 2014 Tron Symposium (TronShow), T-Engine Forum (TEF) Dec. 10, 2014 (Dec. 10, 2014), pp. 1-9, XP032728391.

European Search Report dated Jan. 31, 2018 issued in application No. 16 178 411.1-1208.

APPARATUS FOR DISPLAYING AN IMAGE AND METHOD OF OPERATING THE SAME

CROSS-REFERENCE TO RELATED APPLICATION

This application claims priority from Korean Patent Application No. 10-2015-0101989, filed on Jul. 17, 2015, in the Korean Intellectual Property Office, the disclosure of which is incorporated herein in its entirety by reference.

BACKGROUND

1. Field

Apparatuses and methods consistent with exemplary embodiments relate to an apparatus for displaying an image and a method of operating the same, and more particularly, to an apparatus for displaying an image which receives state information of an Internet of Things (IOT) device and transmits the received state information to an external device in power-on and power-off states, and a method of operating the apparatus for displaying an image.

2. Description of the Related Art

An image display device is a device having a function of displaying an image that may be viewed by a user. The user may view a broadcast through the image display device. The image display device displays a broadcast corresponding to a broadcast signal selected by the user from among broadcast signals transmitted from a broadcasting station. There is a current global trend toward shifting from analog broadcasting to digital broadcasting.

A digital broadcast denotes a broadcast through which a digital video and/or audio signal is transmitted. Compared to an analog broadcast, a digital broadcast is resistant to external noise, and thus has less data loss. Also, a digital broadcast is convenient for error correction, has a higher resolution, and provides a clear screen. Further, a digital broadcast is able to provide an interactive service unlike an analog broadcast.

Recently, smart televisions (TVs) provide various types of content in addition to a digital broadcasting function. A smart TV does not only operate according to a selection of a user, but also provide the user with contents that may be of interest to the user by analyzing the contents even without manipulation of the user.

An image display device may function as a hub of the Internet of Things (IOT) system to monitor states of IOT devices and transfer information about monitored states to a server. Here, the image display device needs to be turned on to continuously monitor the states of the IOT devices, which causes high power consumption of the image display device.

SUMMARY

One or more exemplary embodiments provide a display apparatus that receives state information from at least one Internet of things (IOT) device and transmit the received state information at lower power even in a power-off state by running different software programs in a power-on state and the power-off state, and a method of operating the display apparatus.

Additional aspects will be set forth in part in the description which follows and, in part, will be apparent from the description or may be learned by practice of the presented embodiments.

According to an aspect of an exemplary embodiment, provided is an apparatus for displaying an image, including: a non-volatile memory device configured to store a first program and a second program; and a processor configured to load the first program onto a first area of a volatile memory device to execute the first program in a power-on state of the apparatus, wherein the processor include a plurality of cores, and in a power-off state of the apparatus, the processor is configured to deactivate at least one of the plurality of cores, deactivate the first program loaded onto the first area, and load the second program onto a second area of the volatile memory device to execute the second program, wherein the first program and the second program, when executed, are configured to cause the processor to receive state information of an external device.

The first program, when executed, may cause the processor to perform image processing by using the second area of the volatile memory device.

The first program, when executed, may cause the processor to perform video decoding by using the second area of the volatile memory device.

The first program and the second program, when executed, may transmit the received state information of the external device to an external server.

The processor may perform a control operation of the external device based on at least one of the state information and a control signal from the external server which receives the state information.

The first program, when executed, may cause the processor to perform analyzing a state of the external device based on the received state information of the external device and display a result of the analyzing on a display of the apparatus.

In response to the power-off state being switched to the power-on state, The at least one of the plurality of cores that is deactivated may be activated, and the processor may activate the deactivated first program and execute the first program to perform image processing by using the second area of the volatile memory device.

In the power-on state, the processor may store information about a network connection of the apparatus in the non-volatile memory device, and in the power-off state, the processor may connect the apparatus to a network based on the information about the network connection stored in the non-volatile memory device.

The processor may store, in the non-volatile memory device, first state information of the external device received in the power-on state of the apparatus, and the processor may store, in the non-volatile memory device, second state information of the external device received in the power-off state.

In the power-on state, the processor may perform a control operation of the external device based on at least one of the first state information and the second state information.

According to an aspect of another exemplary embodiment, provided is a method of operating an electronic apparatus, the method including: in a power-on state of the electronic apparatus, loading, by a processor including a plurality of cores, a first program onto a first area of a volatile memory to be executed; in a power-off state of the electronic apparatus, deactivating at least one of the plurality of cores, deactivating the first program, and loading a second program onto a second area of the volatile memory device to be executed; wherein the first program and the second program, when executed, are configured to cause the processor to receive state information of an external device.

The first program, when executed, may cause the processor to perform image processing by using the second area of the volatile memory device.

The first program, when executed, may to cause the processor to perform video decoding by using the second area of the volatile memory device.

The first program and the second program, when executed, may transmit the received state information of the external device to an external server.

The first program, when executed, may cause the processor to perform analyzing a state of the external device based on the received state information of the external device and displaying a result of the analyzing.

The method may further include in response to the power-off state being switched to the power-on state: activating the at least one of the plurality of cores that is deactivated; activating the deactivated first program; and executing the first program to perform image processing by using the second area of the volatile memory device.

The method may further include, in the power-on state, storing, in a non-volatile memory device, information about a network connection of the electronic apparatus, and in the power-off state, connecting the electronic apparatus to a network based on the information about the network connection stored in the non-volatile memory device.

The method may further include storing first state information of the external device received in the power-on state in a non-volatile memory device, and storing second state information of the external device received in the power-off state in the non-volatile memory device.

The method may further include analyzing a state of the external device based on at least one of the first state information and the second state information and displaying a result of the analyzing.

According to an aspect of another exemplary embodiment, provided is an electronic apparatus including: at least one memory configured to store a program; at least one processor configured to read the program and operate as instructed by the program, the program including: a first program configured to cause the at least one processor to receive state information from an external device and perform a control operation of the external device based on the state information; and a second program configured to cause the at least one processor to receive the state information from the external device, the first program and the second program being stored in different regions of the at least one memory, wherein the at least one processor is configured to execute the first program in a power-on state of the electronic apparatus and execute the second program in a power-off state of the electronic apparatus, and wherein the at least one processor includes a plurality of cores, and at least one of the plurality of cores is deactivated in the power-off state.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
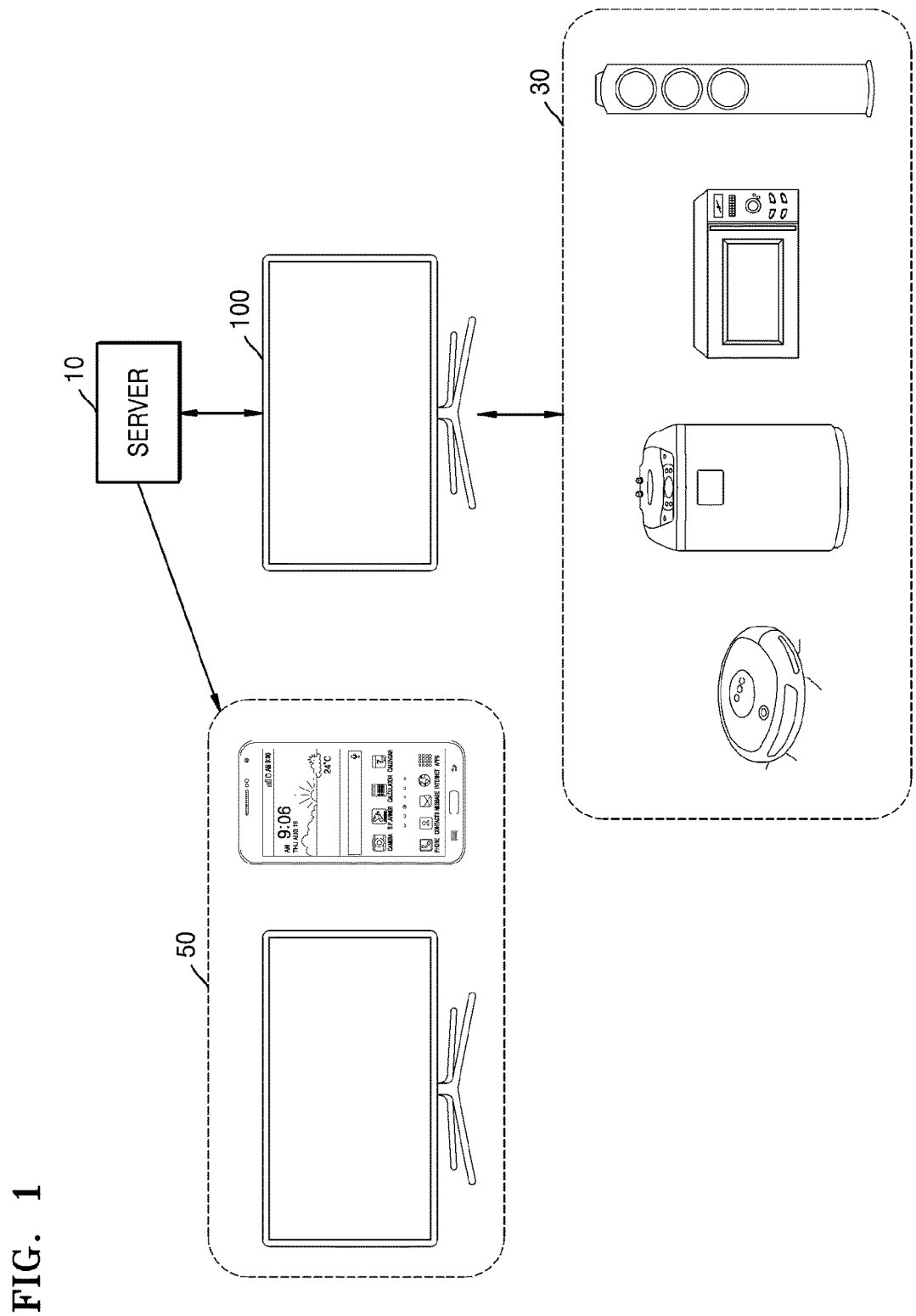
FIG. 1 is a diagram showing an Internet of things (IOT) system according to an exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

As terminology used in this specification, general terms currently in wide use are selected wherever possible in consideration of functions in the disclosure, but may vary according to intentions of those of ordinary skill in the art, precedent cases, the advent of new technology, and the like. In particular, some terms may be arbitrarily selected by the applicant, and in such cases, the detailed meanings of the terms will be stated in the corresponding description. Therefore, the terms used in this specification should be defined based on the meanings of the terms together with the description throughout the specification rather than their simple names.

Throughout the specification, when a portion "includes" an element, unless otherwise described, another element may also be included, rather than the presence of other elements being excluded. Also, terms such as "portion," "module," etc. used herein indicate a unit for processing at least one function or operation, in which the unit may be embodied as hardware or software or may be embodied by a combination of hardware and software.

As used herein, the term "and/or" includes any and all combinations of one or more of the associated listed items. Expressions such as "at least one of," when preceding a list of elements, modify the entire list of elements and do not modify individual elements of the list.

FIG. 1 is a diagram showing an Internet of Things (IOT) system according to an exemplary embodiment.

As shown in FIG. 1, an IOT system may include IOT devices 30, an image display device 100, a server 10, and devices 50.

The IOT devices 30 may generate sensing data based on a result of sensing by the IOT devices 30 and transmit the generated sensing data to the image display device 100. Here, the image display device 100 may include functions of an IOT hub, which may include a function of receiving the sensing data from the IOT devices 30 and transmitting the received sensing data to the devices 50 or the server 10. Also, the functions of an IOT hub may include a function of transmitting a control signal received from the devices 50 and/or the server 10 to the IOT devices 30.

The IOT devices 30 may include general devices (or objects) used in the 10T. For example, the IOT devices 30 may include a temperature sensor, a humidity sensor, a sound sensor, a motion sensor, a proximity sensor, a gas detector sensor, a heat detector sensor, a refrigerator, an air conditioner, a television (TV), a closed circuit TV, a washing machine, a vacuum cleaner, an oven, a dehumidifier, an electric light, a fire alarm, and the like. However, the IOT devices 30 are not limited thereto.

The image display device 100 according to an exemplary embodiment may receive the sensing data from the IOT devices 30 and transmit the received sensing data to the devices 50 and/or the server 10. Also, using the received sensing data, the image display device 100 may display state information of the IOT devices 30 on a display of the image display device 100 and control the IOT devices 30.

When the image display device 100 is powered on, the image display device 100 may run first software using a plurality of cores included in a processor. When the first software is run, the image display device 100 may perform main functions thereof (e.g., a broadcast receiving function, an image processing function, an image display function, etc.) and a function of receiving state information of the IOT device 30 from the IOT device 30 (e.g., a function of receiving sensing data from the IOT device 30). Also, the image display device 100 may provide a service to a user using sensing data received from the IOT device. For example, the image display device 100 may analyze the state information of the IOT device 30 based on the received sensing data and display the analyzed state information of the IOT device 30. Also, the image display device 100 may control the IOT device 30 based on the analyzed state information of the IOT device 30.

On the other hand, when the image display device 100 is powered off, the image display device 100 may run second software using some of the plurality of cores included in the processor. When the second software is run, the image display device 100 may perform the function of receiving state information of the IOT device 30 from the IOT device 30 (e.g., the function of receiving sensing data from the IOT device).

The image display device 100 may include a TV. However, this is merely an example, and the image display device 100 may be implemented as any electronic device including a display. For example, the image display device 100 may be implemented as various electronic devices including a cellular phone, a tablet personal computer (PC), a digital camera, a camcorder, a laptop computer, a desktop, an e-book terminal, a digital broadcasting terminal, a personal digital assistant (PDA), a portable multimedia player (PMP), a navigation device, an MP3 player, a wearable device, and the like. Also, the image display device 100 may be stationary or mobile, and may include a digital broadcast receiver to receive digital broadcasts.

The image display device 100 may be implemented as a flat display device as well as a curved display device with a screen having a curvature and/or a flexible display device whose curvature is adjustable. An output resolution of the image display device 100 may include, for example, high definition (HD), full HD, ultra HD, or a resolution higher than ultra HD.

The devices 50 and the server 10 may receive the sensing data from the image display device 100 and provide services to the user using the received sensing data. For example, the devices 50 and the server 10 may provide a fire alarm service, an anticrime service, a home network service, etc., using the sensing data.

The devices 50 may be a smart phone, a tablet PC, a PC, a smart TV, a cellular phone, a PDA, a laptop computer, a media player, a micro server, a global positioning system (GPS) device, an e-book terminal, a digital broadcasting terminal, a navigation device, a kiosk, an MP3 player, a digital camera, and other mobile or non-mobile computing devices, but are not limited thereto. Also, the devices 50 may be wearable devices, such as a watch, glasses, a hairband, a ring, etc., having a communication function and a data processing function. However, the devices 50 are not limited thereto and may include any kind of a device which may be provided with sensing data for a service, from the image display device 100 or the server 10 through a network.

Figure 2:
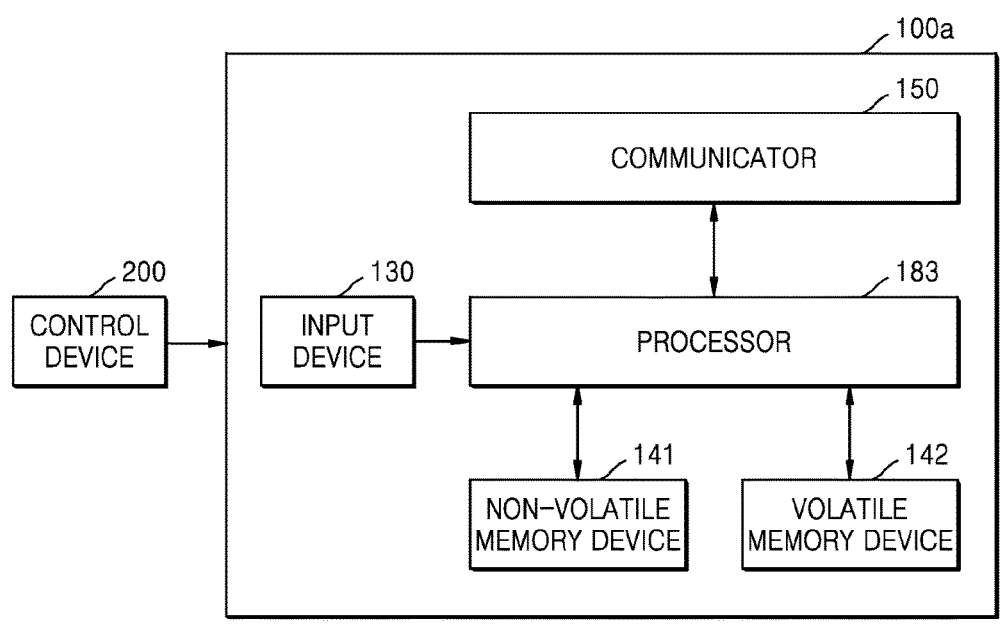
FIG. 2 is a block diagram showing a configuration of an image display device according to an exemplary embodiment.

FIG. 2 is a block diagram showing a configuration of an image display device according to an exemplary embodiment.

An image display device 100*a* of FIG. 2 may be an exemplary embodiment of the image display device 100 of FIG. 1. Referring to FIG. 2, the image display device 100*a* may include an input device 130, a processor 183, a non-volatile memory device 141, a volatile memory device 142, and a communicator 150. However, one or more components of the image display device 100*a*, as shown in FIG. 2, may be replaced, substituted, or omitted according to various embodiments of the image display device 100*a*. Moreover, additional components not shown in FIG. 2 may be added to the image display device 100*a*.

The input device 130 according to an exemplary embodiment may receive a user input and transfer a signal corresponding to the user input to the processor 183. Also, according to an exemplary embodiment, user inputs including an input of turning on or off a power of the image display device 100*a*, a channel selection input, a channel-up/down input, a screen setting input, etc. may be received from a control device 200 through the communicator 150. In this case, an input device of the image display device may be implemented as the control device 200. Alternatively, the input device may include various types of input devices such as, for example, a keypad, a button, a touch pad, a touch screen, a scroll wheel, a jog key, or the like.

The processor 183 according to an exemplary embodiment functions to control overall operation of the image display device 100*a* and signal flow between internal elements of the image display device 100*a*, and to process data. Also, the processor 183 controls running of software (e.g., an operating system (OS) and application programs) stored in the image display device 100*a*. For example, the processor 183 may correspond to a central processing unit (CPU).

For example, the processor 183 may load software stored in the non-volatile memory device 141 onto the volatile memory device 142 to run the software, and control the image display device 100*a* according to a user instruction received through the input device 130 or the software that is run by the processor 183.

The processor 183 may include a graphic processing unit (GPU; not shown) to perform processing graphics corresponding to a video. The processor 183 may be implemented as a system on chip (SoC) in which a core and the GPU are integrated. The processor 183 may include a single core, dual cores, triple cores, quadruple cores, or a number of cores which is a multiple thereof.

The processor 183 may include a plurality of processors. For example, the processor 183 may be implemented to include a main processor and a sub-processor which operates in a sleep mode.

The non-volatile memory device 141 according to an exemplary embodiment may store various kinds of data and software (e.g., the OS, application programs, etc.) to drive and control the image display device 100a. The non-volatile memory device 141 may store the first software and the second software. Here, the first software may be software to perform main functions (e.g., a broadcast receiving function, an image processing function, an image display function, etc.) of the image display device 100a as well as the function of receiving state information of an IOT device from the IOT device and transmitting the received state information to an external server (e.g., the function of receiving sensing data from the IOT device and transmitting the received sensing data to the external server). On the other hand, the second software may be software to perform the function of receiving state information of an IOT device from the IOT device and transmitting the received state information to the external server and not the main functions of the image display device 100a. For example, the second software may be software to perform only the function of receiving the state information of the IOT device and/or transmitting the received state information to the external server.

Data stored in the non-volatile memory device 141 is not removed when the power supply is interrupted, and the non-volatile memory device 141 may include a flash memory device, such as a NAND flash memory, a NOR flash memory, and the like.

The non-volatile memory device 141 may be controlled by a controller (not shown). The controller may receive a control instruction from the processor 183 and store data in the non-volatile memory device 141 or read data stored in the non-volatile memory device 141.

The processor 183 according to an exemplary embodiment may load software stored in the non-volatile memory device 141 onto the volatile memory device 142 and run the software.

The processor 183 may access data related to the software (e.g., the OS, application programs, etc.) loaded onto the volatile memory device 142. Data stored in the volatile memory device 142 is removed when the power supply is interrupted, and the volatile memory device 142 may include a static random access memory (SRAM), a dynamic random access memory (DRAM), and the like.

The communicator 150 according to an exemplary embodiment may connect the image display device 100a to an external device (e.g., a server, an audio device, etc.) under control of the processor 183. The processor 183 may exchange content with the external device connected through the communicator 150, download an application from the external device, or perform web browsing. The communicator 150 may communicate with the external device using, for example but not limited to, at least one of Bluetooth, near field communication (NFC), wireless fidelity (Wi-Fi), Zigbee, Z-Wave, infrared data association (IrDA) communication, Wi-Fi direct (WFD), ultra wideband (UWB), Ant+ communication, and Bluetooth low energy (BLE).

The communicator 150 according to an exemplary embodiment may receive data sensed by an IOT device (e.g., state information of the IOT device) and transmit the received sensing data to the external server. At this time, the communicator 150 may communicate with the IOT device using Zigbee, Z-Wave, etc., and communicate with the external server using Bluetooth, Wi-Fi, etc.

The control device 200 according to an exemplary embodiment may be implemented in various forms of devices, such as a remote control, a cellular phone, etc., to control the image display device 100a.

The control device 200 may control the image display device 100a using short-range communication including infrared communication and/or Bluetooth communication. The control device 200 may control functions of the image display device 100a using at least one of a key input (e.g., an input through a button and/or a touchpad), a microphone to receive a user's voice, and a sensor to recognize a motion of the control device 200.

The control device 200 may include a power-on/off button to turn on or off a power of the image display device 100a. The control device 200 may switch a channel of the image display device 100a, control a volume of the image display device 100a, select a terrestrial/cable/satellite broadcast, or set an environment of the image display device 100a according to a user input.

The control device 200 may include a pointing device. For example, the control device 200 may operate as a pointing device when a particular key input is received.

The image display device 100a may be controlled by a user input of moving the control device 200 upward, downward, to the left, or to the right, or tilting the control device 200 in an arbitrary direction. Information on a motion of the control device 200 sensed through a sensor of the control device 200 may be transmitted to the image display device 100a. The image display device 100a may calculate coordinates of a cursor on a display of the image display device 100a based on the information on the motion of the control device 200 and move the cursor to correspond to the calculated coordinates. Accordingly, the cursor on the display of the image display device 100a may be moved, or at least one of various menus may be activated.

Alternatively, when the control device 200 includes a touchpad, the cursor on the display of the image display device 100a may be moved or at least one of various menus may be selectively activated, according to a displacement value of an object such as a user's finger or a stylus pen, which moves on the touchpad.

Figure 3:
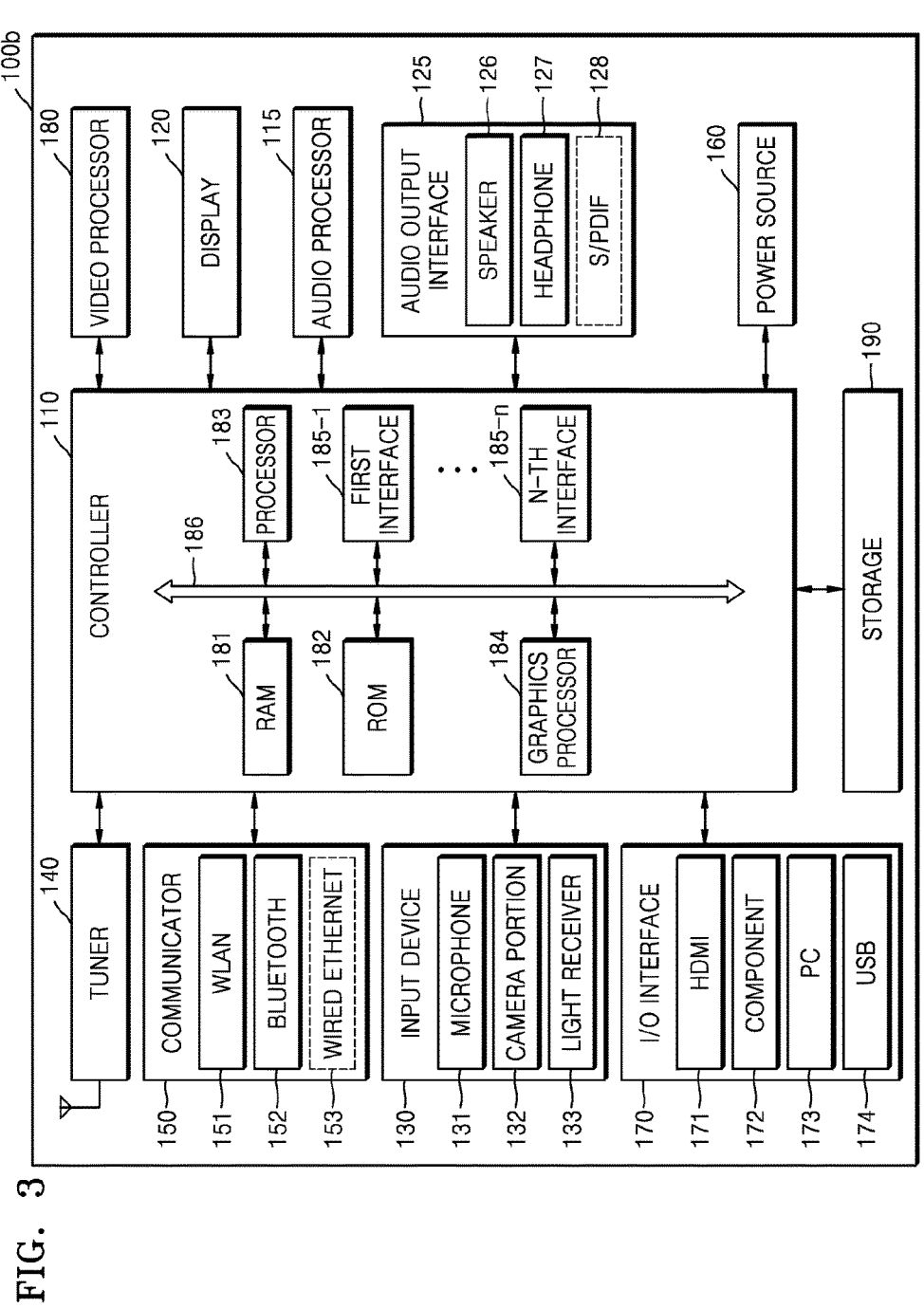
FIG. 3 is a block diagram showing a configuration of an image display device according to an exemplary embodiment.

FIG. 3 is a block diagram showing a configuration of an image display device according to an exemplary embodiment. An image display device 100b of FIG. 3 may be an exemplary embodiment of the image display device 100 of FIG. 1.

Referring to FIG. 3, the image display device 100b according to an exemplary embodiment may include a controller 110, a display 120, an input device 130, a video processor 180, an audio processor 115, an audio output interface 125, a power source 160, a tuner 140, a communicator 150, an input/output (I/O) interface 170, and a storage 190. However, one or more components of the image display device 100b, as shown in FIG. 3, may be replaced, substituted, or omitted according to various embodiments of the image display device 100b. Moreover, additional components not shown in FIG. 3 may be added to the image display device 100b.

The configuration of the image display device 100a described with reference to FIG. 2 may be similarly applied to the configuration of the image display device 100b shown in FIG. 3.

The video processor 180 processes video data received by the image display device 100b. The video processor 180 may perform various kinds of image processing, such as decoding, scaling, noise filtering, frame rate conversion, resolution conversion, etc., on the video data.

The display 120 generates a drive signal by converting an image signal, a data signal, an on screen display (OSD) signal, a control signal, etc. processed by the controller 110. The display 120 may be implemented as a plasma display panel (PDP), a liquid crystal display (LCD), an organic light-emitting diode (OLED) display, a flexible display, etc., and may also be implemented as a three-dimensional (3D) display. Further, the display 120 may be configured as a touch screen and used as an input device as well as an output device.

The display 120 displays a video included in a broadcast signal received through the tuner 140 on a screen under control of the controller 110. Also, the display 120 may display content (e.g., a video clip) input through the communicator 150 and/or the I/O interface 170. The display 120 may output an image stored in the storage 190 under the control of the controller 110. Also, the display 120 display a voice user interface (UI) (e.g., including a voice instruction guide) to perform a voice recognition task corresponding to voice recognition and/or a motion UI (e.g., including a user motion guide for motion recognition) to perform a motion recognition task corresponding to motion recognition.

The display 120 according to an exemplary embodiment may display state information of an IOT device received from the communicator 150.

The audio processor 115 processes audio data. The audio processor 115 may perform various kinds of processing, such as decoding, amplification, noise filtering, etc., on the audio data. The audio processor 115 may have a plurality of audio processing modules to process audio corresponding to a plurality of pieces of content.

The audio output interface 125 outputs audio included in the broadcast signal received through the tuner 140 under the control of the controller 110. The audio output interface 125 may output audio (e.g., a voice or a sound) input through the communicator 150 and/or the I/O interface 170. Also, the audio output interface 125 may output audio stored in the storage 190 under the control of the controller 110. The audio output interface 125 may include at least one of a speaker 126, a headphone output terminal 127, and a Sony/Philips digital interface (S/PDIF) output terminal 128. The audio output interface 125 may include a combination of at least two from among the speaker 126, the headphone output terminal 127, and the S/PDIF output terminal 128.

The power source 160 supplies a power input from an external power source to the internal elements of the image display device 100b under the control of the controller 110. Also, the power source 160 may supply the internal elements with a power output from one or more batteries (not shown) placed within the image display device 100b under the control of the controller 110.

The tuner 140 may process a broadcast signal received in a wired and/or wireless manner through amplification, mixing, resonance, etc., and select and tune to a specific frequency of a channel that the image display device 100b is set to receive from among a plurality of radio wave components of the received broadcast signal. The broadcast signal includes an audio, a video, and additional information (e.g., an electronic program guide (EPG)).

The tuner 140 may receive a broadcast signal in a frequency band corresponding to a channel number (e.g., a cable broadcasting number) according to a user input (e.g., a control signal received from the control device 200, for example, an input of a channel number, a channel up-down input, or a channel input in an EPG screen).

The tuner 140 may receive broadcast signals from various sources, such as a terrestrial broadcast, a cable broadcast, a satellite broadcast, an Internet broadcast, and the like. The tuner 140 may also receive a broadcast signal from a source, such as an analog broadcast, a digital broadcast, or the like. A broadcast signal received through the tuner 140 is decoded (e.g., audio decoding, video decoding, or additional information decoding) and divided into an audio, a video, and/or additional information. The divided audio, video, and/or additional information may be stored in the storage 190 under the control of the controller 110.

The tuner 140 of the image display device 100b may be singular or plural in number. The tuner 140 may be integrally implemented (e.g., all-in-one) with the image display device 100b, as a separate device (e.g., a set-top box) having a tuner electrically connected to the image display device 100b, or as a tuner connected to the I/O interface 170.

The communicator 150 may connect the image display device 100b to an external device (e.g., an audio device, etc.) under the control of the controller 110. The communicator 150 may include one of, for example but not limited to, a wireless local area network (WLAN) module 151, a Bluetooth module 152, and a wired Ethernet module 153 in accordance with performance and the structure of the image display device 100b. Also, the communicator 150 may include a combination of at least two from among the WLAN module 151, the Bluetooth module 152, and the wired Ethernet module 153. The communicator 150 may receive a control signal of the control device 200 under the control of the controller 110. The control signal may be implemented as a Bluetooth type, a radio frequency (RF) signal type, and/or a Wi-Fi type.

For example, the communicator 150 may receive a signal corresponding to a Bluetooth-type user input (e.g., a touch, a press, a touch gesture, a voice, or a motion) from the control device 200 through the Bluetooth module 152.

In addition to the Bluetooth module 152, the communicator 150 may further include other short-range communication modules (e.g., an NFC module) and a BLE module).

The input device 130 may include a sensor to sense the user's voice, image, and/or interaction with the image display device 100b. For example, the input device 130 may include a microphone 131, a camera portion 132, and a light receiver 133.

The microphone 131 receives a spoken voice of the user. The microphone 131 may convert the received voice into an electrical signal and output the electrical signal to the controller 110. The user's voice may include, for example, a speech corresponding to a menu or a function of the image display device 100b. A recognition range of the microphone 131 may be, for example, about 4 m or less between the microphone 131 and the user's location. The recognition range of the microphone 131 may vary according to the level of the user's voice and an environment of the surroundings (e.g., a level of a speaker sound and a level of ambient noise).

According to an exemplary embodiment, the microphone 131 may receive a spoken voice, etc. of the user and output received voice data to the controller 110 so that the controller 110 may use the voice data to identify the identity of the user who watches the image display device 100b.

The microphone 131 may be implemented integrally with or separately from the image display device 100b. The separate microphone 131 may be electrically connected to the image display device 100b through the communicator 150 and/or the I/O interface 170.

Those of ordinary skill in the art would easily appreciate that the microphone 131 may be omitted according to performance and the structure of the image display device 100b.

The camera portion (or camera) 132 captures images (e.g., consecutive frames) corresponding to a motion of the user including a gesture within a camera recognition range. For example, the recognition range of the camera portion 132 may be a distance of about 0.1 m to about 5 m from the camera portion 132. A motion of the user may include a motion of the user's entire body or a motion of a part of the user's body, for example, a facial expression or a motion of a hand, a fist, or a finger of the user. Under the control of the controller 110, the camera portion 132 may convert the captured images into an electrical signal and output the electrical signal to the controller 110. In an exemplary embodiment, the controller 110 may recognize a motion of the user based on the captured images of the camera portion 132.

According to an exemplary embodiment, the camera portion 132 may capture at least a part of the user (e.g., the face) of the user and output the captured facial image to the controller 110 so that the controller 110 may use the facial image to identify the identity of the user who watches the image display device 100b.

The controller 110 may select a menu displayed on the display of the image display device 100b using a result of recognizing the user's motion based on the received images, or perform a control function corresponding to the motion recognition result. For example, the control function corresponding to the motion recognition result may include channel switching, volume control, indicator movement, and cursor movement.

The camera portion 132 may include a lens and an image sensor. Using a plurality of lenses and image processing, the camera portion 132 may support optical zoom or digital zoom. The recognition range of the camera portion 132 may be predetermined or variously set according to the angle and surroundings of a camera. When the camera portion 132 includes a plurality of cameras, it is possible to receive a still 3D image or a 3D motion using the plurality of cameras.

The camera portion 132 may be implemented integrally with or separately from the image display device 100b. An additional device including the separate camera portion 132 may be electrically connected to the image display device 100b through the communicator 150 and/or the I/O interface 170.

Those of ordinary skill in the art would easily appreciate that the camera portion 132 may be omitted according to performance and the structure of the image display device 100b.

The light receiver 133 receives an optical signal from the external control device 200 through a light-receiving window that is positioned in a bezel of the display 120 or the like. The light receiver 133 may receive an optical signal corresponding to a user input (e.g., a touch, a press, a touch gesture, a voice, or a motion) from the control device 200. The optical signal may include a control signal and the control signal may be extracted from the received optical signal under the control of the controller 110.

The I/O interface 170 receives video (e.g., a video clip, etc.), audio (e.g., voice, music, etc.), additional information (e.g., an EPG, etc.), etc. from the outside of the image display device 100b under the control of the controller 110. The I/O interface 170 may include at least one of a high-definition multimedia interface (HDMI) port 171, a component jack 172, a PC port 173, and a universal serial bus (USB) port 174. The I/O interface 170 may include a combination of at least two from among the HDMI port 171, the component jack 172, the PC port 173, and the USB port 174.

Those of ordinary skill in the art would easily appreciate that the configuration and operation of the I/O interface 170 may be variously implemented according to exemplary embodiments.

The controller 110 functions to control overall operation of the image display device 100b and signal flow between internal elements of the image display device 100b, and to process data. When there is an input of the user or a preset condition is satisfied, the controller 110 may execute an OS and various applications stored in the storage 190.

The controller 110 may include a random access memory (RAM) 181, a read only memory (ROM) 182, and a processor 183. The RAM 181 may store a signal and/or data input from the outside of the image display device 100b or the RAM 181 may be used as a storage area corresponding to various tasks performed in the image display device 100b. The ROM 182 may store a control program to control the image display device 100b.

The processor 183 may correspond to the processor 183 of FIG. 2 and the RAM 181 may correspond to the volatile memory device 142 of FIG. 2, and thus, repetitive descriptions will be omitted.

A graphics processor 184 generates a screen including a variety of objects, such as icons, images, text, etc., using a calculator and a renderer. Using a user input received through the input device 130, the calculator may calculate attribute values, such as coordinate values, a shape, a size, a color, etc. that are related to displaying of an object on the screen, according to a layout of the screen. The renderer may generate a screen including an object based on the attribute values calculated by the calculator. The screen generated by the render may have various layouts. The screen generated by the renderer may be displayed in the display area of the display 120.

First to n-th interfaces 185-1 to 185-n are connected to the various elements described above. At least one of the interfaces 185-1 to 185-n may be a network interface which is connected to the external device through a network.

The RAM 181, the ROM 182, the processor 183, the graphics processor 184, and the first to n-th interfaces 185-1 to 185-n may be connected to each other through an internal bus 186.

Here, the term "controller of an image display device" refers to a controller including the processor 183, the ROM 182, and the RAM 181.

The storage 190 may store various types of data, programs, and/or applications to drive and control the image display device 100b under the control of the controller 110. The storage 190 may store input and output signals and/or data corresponding to operation of the video processor 180, the display 120, the audio processor 115, the audio output interface 125, the power source 160, the tuner 140, the communicator 150, the input device 130, and the I/O interface 170. The storage 190 may store a control program to control the image display device 100b (e.g., the controller 110), an application originally provided by a manufacturer or externally downloaded, a graphical UI (GUI) related to applications, objects (e.g., image text, icons, buttons, etc.) to provide the GUI, user information, documents, databases (DBs), or related data.

In an exemplary embodiment, the term "storage" includes the storage 190, the ROM 182 and the RAM 181 of the controller 110, or a memory card (e.g., a micro secure digital (SD) card or a USB memory) installed in the image display device 100b. Also, the storage 190 may include a non-volatile memory, a volatile memory, a hard disk drive (HDD), or a solid-state drive (SSD).

Although not shown, the storage 190 may include a broadcast receiving module, a channel control module, a volume control module, a communication control module, a voice recognition module, a motion recognition module, a light receiving module, a display control module, an audio control module, an external input control module, a power control module, a power control module for an external device connected in a wireless manner (e.g., Bluetooth), a voice DB, and a motion DB. The above modules and DBs of the storage 190 may be implemented in the form of software to perform a broadcast-receiving control function, a channel control function, a volume control function, a communication control function, a voice recognition function, a motion recognition function, a light-receiving control function, a display control function, an audio control function, an external input control function, a power control function, or a power control function for an external device connected in a wireless manner (e.g., Bluetooth), in the image display device 100b. The controller 110 may perform a respective function using the software stored in the storage 190.

The image display device 100b having the display 120 may be electrically connected to a separate external device (e.g., a set-top box; not shown) having a tuner. For example, the image display device 100b may be implemented as an analog TV, a digital TV, a 3D TV, a smart TV, a light emitting diode (LED) TV, an OLED TV, a plasma TV, a monitor, etc., but those of ordinary skill in the art would easily appreciate that the image display device 100b is not limited thereto.

The image display device 100b may include a sensor (e.g., an illumination sensor, a temperature sensor, etc.) to detect an internal state or an external state thereof.

The block diagrams of the image display devices 100a and 100b shown in FIGS. 2 and 3 are merely examples. Each element of the block diagrams may be integrated, added, or omitted according to the specifications of the image display device 100. In other words, two or more elements may be combined into one element, or one element may be subdivided into two or more elements. A function performed by each block is intended to describe embodiments, and a detailed operation or device of each block does not limit the scope of the present disclosure.

Figure 4:
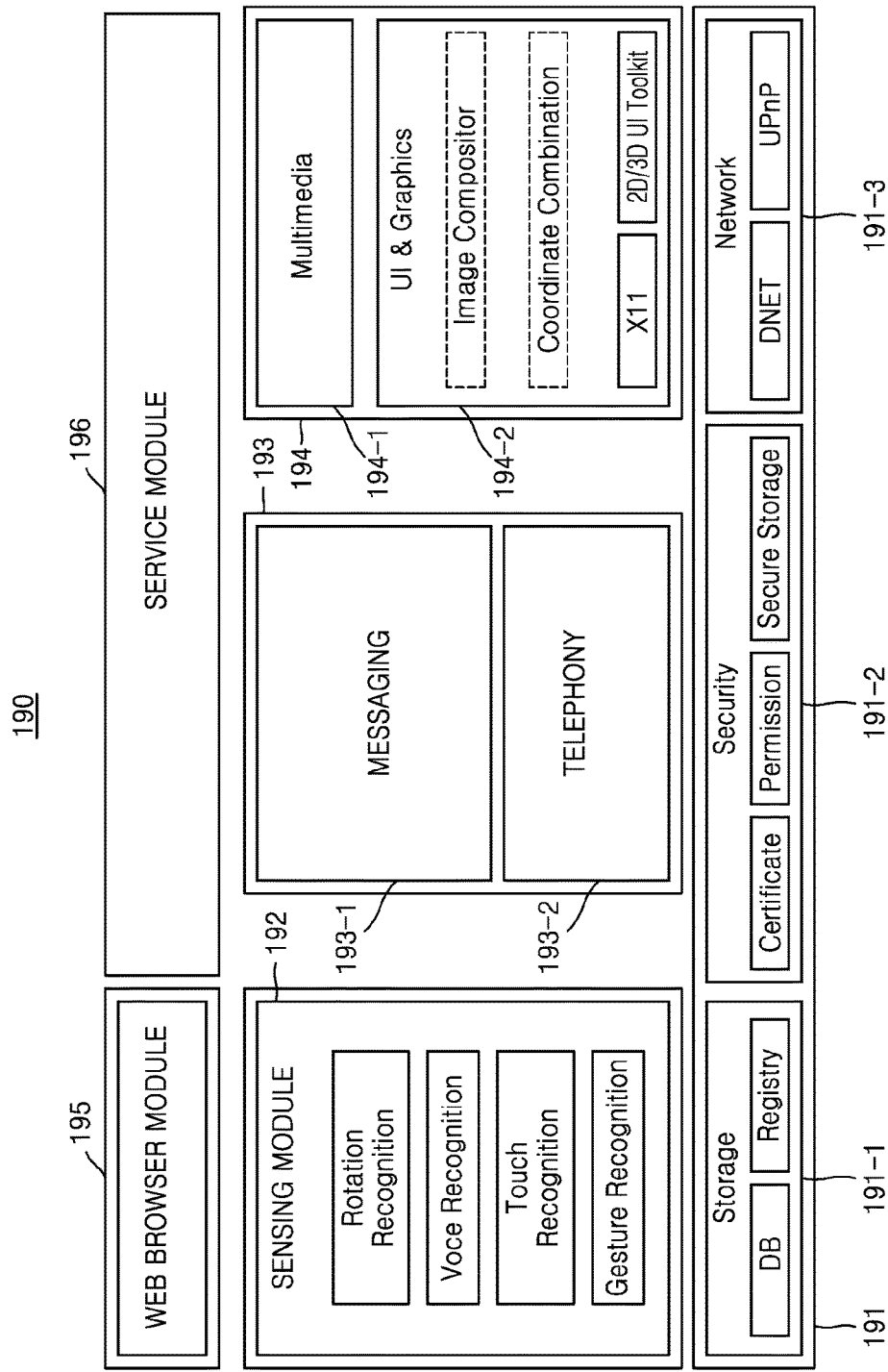
FIG. 4 is a diagram illustrating a configuration of software stored in a storage of FIG. 3.

FIG. 4 is a diagram illustrating a configuration of software stored in the storage 190 of FIG. 3.

Referring to FIG. 4, the storage 190 may store software including a base module 191, a sensing module 192, a communication module 193, a presentation module 194, a web browser module 195, and a service module 196.

The base module 191 denotes a basic module which processes a signal transferred from hardware included in the image display device 100 and transfers the processed signal to an upper layer module. The base module 191 includes a storage module 191-1, a security module 191-2, a network module 191-3, and the like. The storage module 191-1 is a program module which manages a DB or a registry. The processor 183 may access a DB in the storage 190 using the storage module 191-1 to read out various kinds of data. The security module 191-2 is a program module which supports certification, permission, secure storage, etc. with respect to hardware. The network module 191-3 is a module that supports network connections and includes a DNET module, a universal plug and play (UPnP) module, and the like.

The sensing module 192 collects information from various sensors and analyzes and manages the collected information. The sensing module 192 may include, for example, a head direction recognition module, a face recognition module, a voice recognition module, a motion recognition module, an NFC recognition module, and the like.

The communication module 193 is a module that performs communication with an external device. The communication module 193 may include a messaging module 193-1 and a telephony module 193-2. The messaging module 193-1 may include a messenger program, a short message service (SMS) program, a multimedia message service (MMS) program, an e-mail program, etc., and the telephony module 193-2 may include a call information aggregator program module, a voice over Internet protocol (VoIP) module, and the like.

The communication module 193 according to an exemplary embodiment may include an IOT module to collect data sensed by an IOT device by communicating with the IOT device and transmitting the collected sensing data to an external server and the like.

The IOT module may analyze the collected sensing data and transmit a control signal to the IOT device.

The presentation module 194 is a module that configures a display screen. The presentation module 194 includes a multimedia module 194-1 that generates and plays multimedia content, and a UI rendering module 194-2 to process a UI and graphics. The multimedia module 194-1 may include a player module, a camcorder module, a sound processing module, and the like. Accordingly, the multimedia module 194-1 performs an operation of generating and playing a screen and/or sound by playing various kinds of multimedia content. The UI rendering module 194-2 may include an image compositor module which combines images, a coordinate combining module which combines and/or generates coordinates on the screen at which an image is to be displayed, an X11 module which receives various events from hardware, a two-dimensional (2D)/3D UI toolkit which provides tools to configure a 2D or 3D UI.

The web browser module 195 denotes a module which accesses a web server through web browsing. The web browser module 195 may include various modules, such as a web viewing module which composes a web page, a download agent module which performs downloads, a bookmark module, a Webkit module, and the like.

The service module 196 is a module including various applications to provide various services. For example, the service module 196 may include various program modules, such as a social networking service (SNS) program, a content playback program, a game program, an e-book program, a calendar program, an alarm management program, other various widgets, and the like.

Although various program modules are shown in FIG. 4, some of the shown program modules may be omitted, modified, or added according to a kind and characteristics of the image display device 100. For example, a location-based module which supports a location-based service by interworking with hardware, such as a GPS chip, may also be included.

Figure 5:
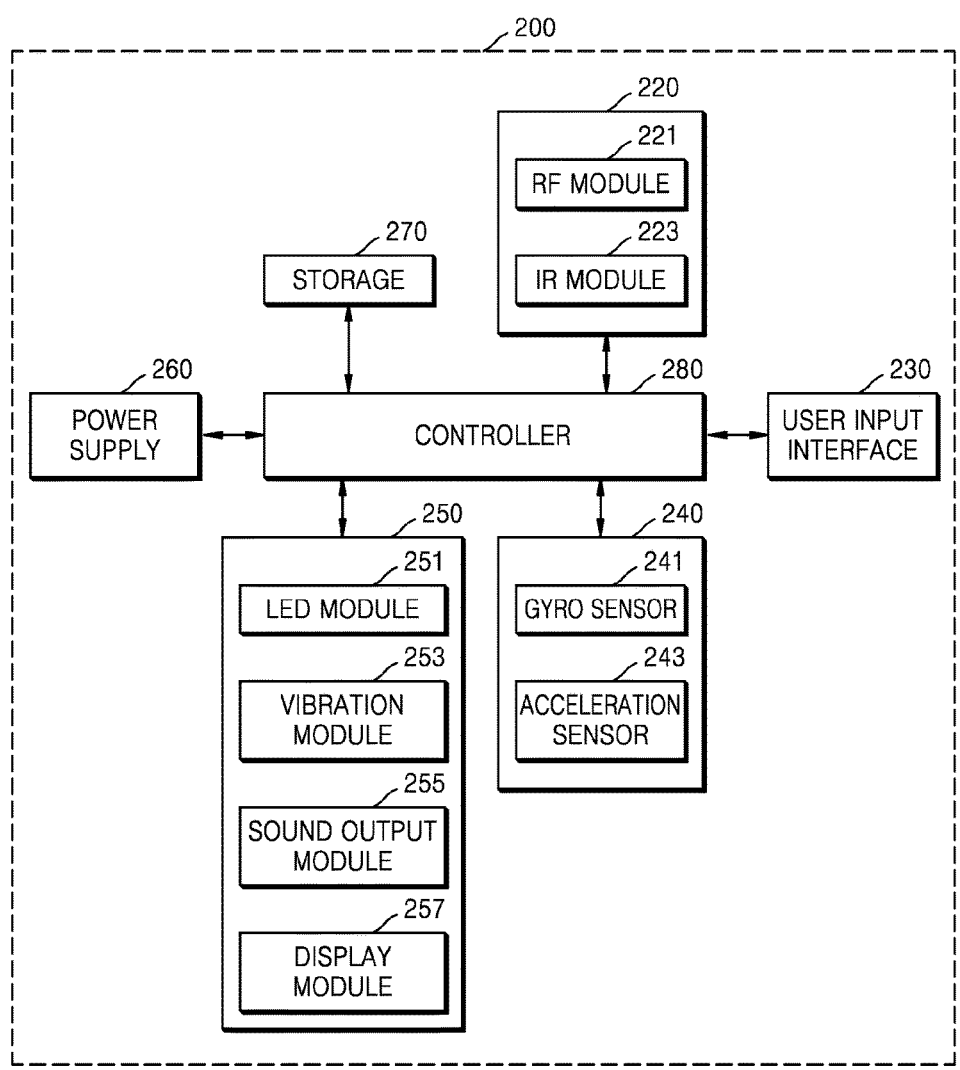
FIG. 5 is a block diagram showing a configuration of a control device according to an exemplary embodiment.

FIG. 5 is a block diagram showing a configuration of a control device according to an exemplary embodiment.

Referring to FIG. 5, the control device 200 may include a wireless communicator 220, a user input interface 230, a sensor 240, an output interface 250, a power supply 260, a storage 270, and a controller 280.

The wireless communicator 220 may exchange signals with any one of image display devices 100, 100a, and 100b according to the exemplary embodiments described above. The wireless communicator 220 may have a radio frequency (RF) module 221 which exchanges signals with the image display device 100 according to an RF communication standard. Also, the control device 200 may have an infrared (IR) module 223 which exchanges signals with the image display device 100 according to an IR communication standard.

In an exemplary embodiment, the control device 200 transmits a signal containing information on a motion, etc. of the control device 200 to the image display device 100 through the RF module 221.

Also, the control device 200 may receive a signal from the image display device 100 through the RF module 221. The control device 200 may transmit an instruction to perform powering on/off, channel switching, volume control, etc., to the image display device 100 through the IR module 223.

The user input interface 230 may include a keypad, buttons, a touch pad, a touch screen, or the like. A user may input an instruction related to the image display device 100 to the control device 200 by manipulating the user input interface 230. When the user input interface 230 has a hard key button, the user may input an instruction related to the image display device 100 to the control device 200 through an action of pushing the hard key button. For example, the user input interface 230 may include a power-on button and a power-off button.

When the user input interface 230 has a touch screen, the user may input an instruction related to the image display device 100 to the control device 200 by touching a soft key of the touch screen. Also, the user input interface 230 may have various types of input devices, such as a scroll wheel, a jog key, etc., which may be manipulated by the user.

The sensor 240 may have a gyro sensor 241 or an acceleration sensor 243. The gyro sensor 241 may sense information on a motion of the control device 200. As an example, the gyro sensor 241 may sense information on a motion of the control device 200 based on x, y, and z axes. The acceleration sensor 243 may sense information on a moving speed, etc. of the control device 200. A distance measuring sensor may also be included, and the distance from the image display device 100 may be sensed by the distance measuring sensor.

The output interface 250 may output an image and/or voice signal corresponding to manipulation through the user input interface 230 or corresponding to a signal received from the image display device 100. Through the output interface 250, the user of the control device 200 may detect whether the user input interface 230 is manipulated or a signal is received from the image display device 100.

As an example, the output interface 250 may have an LED module 251, a vibration module 253, a sound output module 255, and a display module 257. When the user input interface 230 is manipulated or signals are exchanged between the control device 200, the LED module 251 is turned on, the vibration module 253 generates vibration, the sound output module 255 outputs a sound, or the display module 257 outputs a video.

The power supply 260 supplies power to the control device 200. When the control device 200 is not moved for a certain time, the power supply 260 may reduce power consumption by interrupting the power supply. When a certain key (e.g., a power supply key) provided in the control device 299 is manipulated, the power supply 260 may resume the power supply.

The storage 270 may store various kinds of programs, application data, etc. to control or operate the control device 200.

The controller 280 controls an operation of the control device 200. The controller 280 may transmit a signal corresponding to manipulation on a certain key of the user input interface 230 or transmit a signal corresponding to a motion of control device 200 sensed by the sensor 240, to the image display device 100 through the wireless communicator 220.

The image display device 100 may include a coordinate value calculator to calculate coordinate values of a cursor corresponding to a motion of the control device 200.

The coordinate value calculator may calculate coordinate values (x, y) of a cursor to be displayed on the display 120 by correcting a tremor of a hand or an error of a signal corresponding to the sensed motion of the control device 200.

A signal of the control device 200 is transmitted to the controller 110 of the image display device 100 through the communicator 150. The controller 110 may determine information on the motion of the control device 200 and a key manipulation, based on the signal transmitted by the control device 200, and control the image display device 100 according to the information.

As another example, the control device 200 may calculate coordinate values of the cursor corresponding to the motion and transmit the coordinate values to the image display device 100. In this case, the image display device 100 may transmit information on the received pointer coordinate values to the controller 110 of the image display device 10 without a hand tremor or error correction process.

Figure 6:
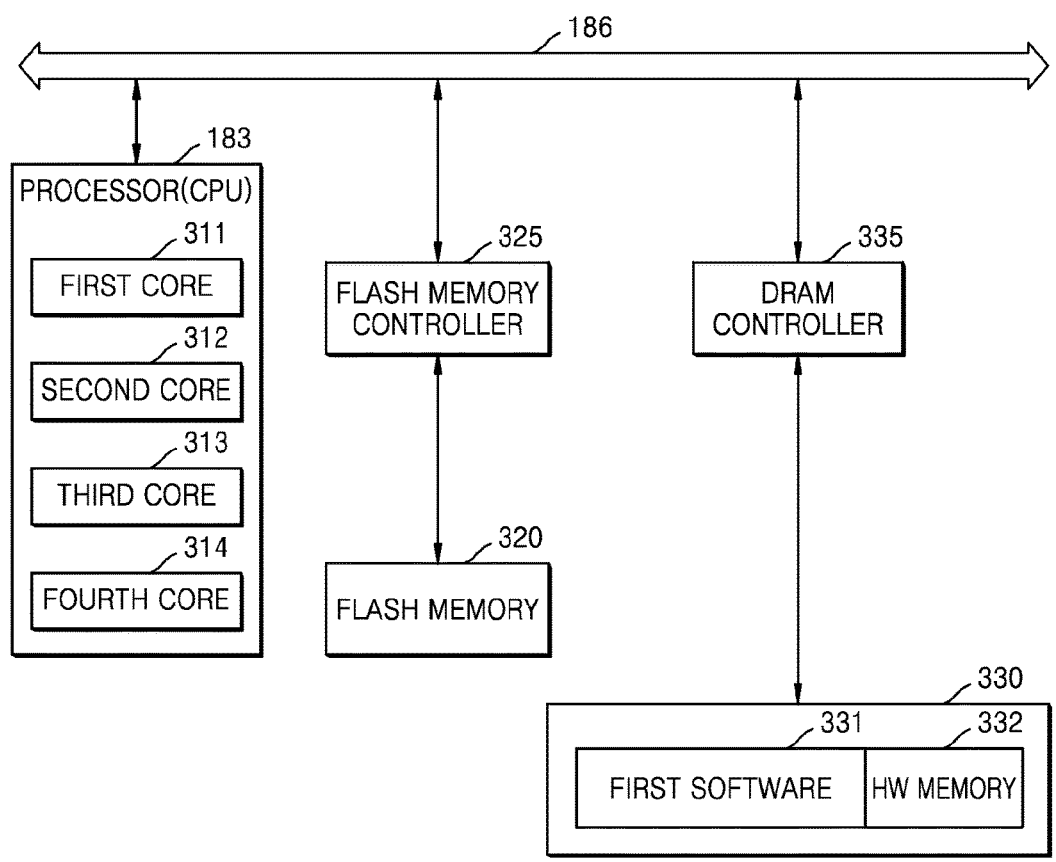
FIGS. 6 and 7 are diagrams illustrating an operating method of an image display device when the image display device is powered on, according to an exemplary embodiment.
Figure 7:
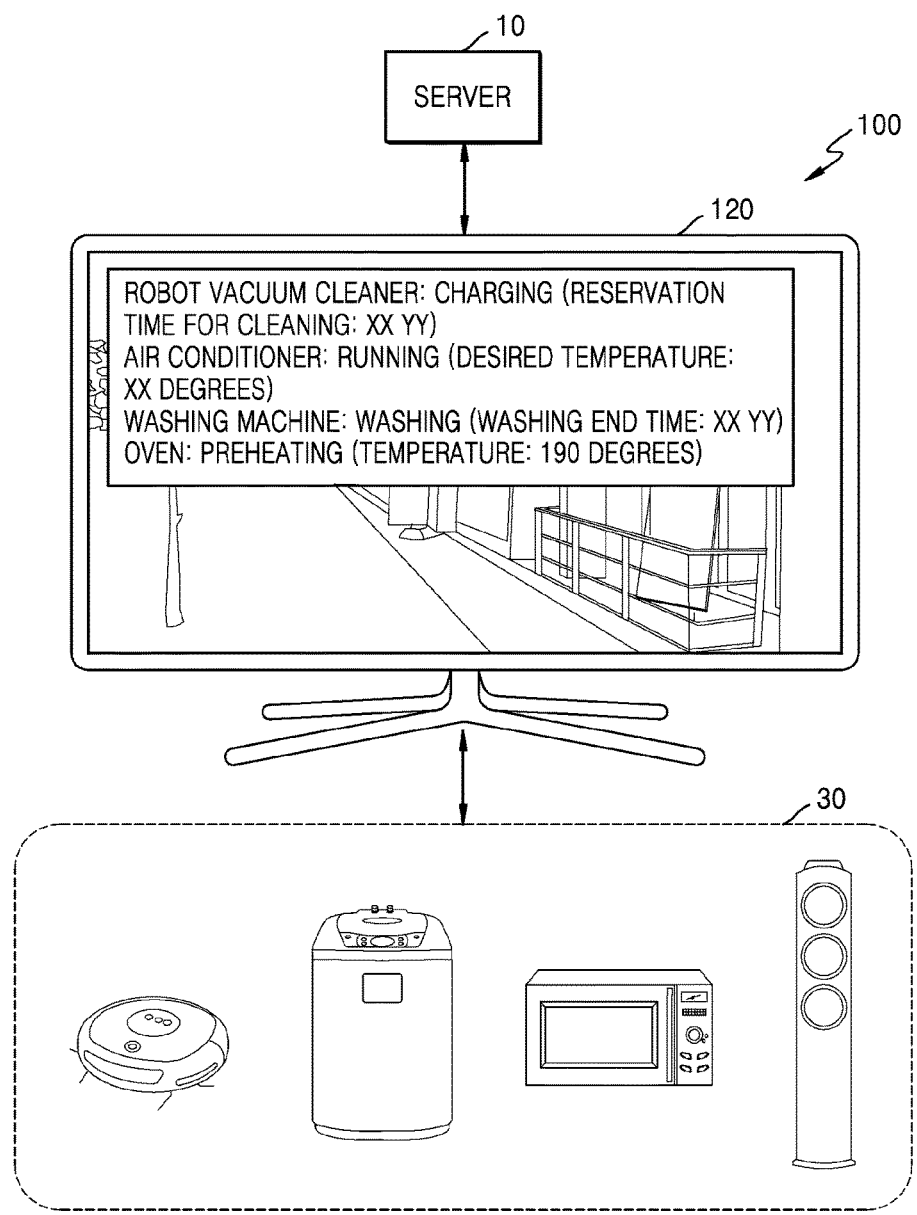

FIGS. 6 and 7 are diagrams illustrating a method of operating an image display device when the image display device is powered on, according to an exemplary embodiment.

Referring to FIG. 6, the image display device 100 according to an exemplary embodiment may include the processor 183, a flash memory 320, a flash memory controller 325, a DRAM 330, and a DRAM controller 335. The processor 183, the flash memory controller 325, and the DRAM controller 335 may be connected to each other through the internal bus 186.

The processor 183 may include a plurality of cores. Although FIG. 6 shows that the processor 183 includes quadruple cores (a first core 311, a second core 312, a third core 313, and a fourth core 314), the number of cores included in the processor 183 is not limited thereto. The flash memory 320 corresponds to the non-volatile memory device described with reference to FIG. 2, and the DRAM 330 corresponds to the volatile memory device described with reference to FIG. 2.

When a user input of turning on the power of the image display device 100 is received, the processor 183 may transmit a first control signal to the flash memory controller 325. The flash memory controller 325 reads the first software stored in the flash memory 320 in response to the first control signal, and the DRAM controller 335 may control the read first software to be loaded onto a first area 331 of the DRAM 330. However, this is merely an example and the exemplary embodiments are not limited thereto. For example, the processor 183 may transmit the first control signal in response to the image display device 100 entering into a power-on state without receiving a user input (e.g., automatic turn-on timer).

When the first software is loaded onto the first area 331 of the DRAM 330, the processor 183 may run the first software. The first software may be software to perform main functions (e.g., a broadcast receiving function, an image processing function, an image display function, etc.) of an image display device and a function of receiving state information of an IOT device from the IOT device and transmitting the received state information to an external server (e.g., a function of receiving sensing data from the IOT device and transmitting the received sensing data to the external server). However, this is only an example and the first software is not limited to perform the above functions.

When the first software is loaded onto the first area 331 and run, the image display device 100 may receive a broadcast, process a received broadcast image, and display the image on a display of the image display device. In an exemplary embodiment, the image display device 100 may use a second area 332 of the DRAM 330 as a storage area (e.g., a hardware memory) corresponding to image processing.

For example, the image display device 100 may perform processing, e.g., various kinds of image processing including decoding, scaling, noise filtering, frame rate conversion, resolution conversion, etc. on received video data using the second area 332 of the DRAM 330. Also, the image display device 100 may perform processing, e.g., various kinds of processing of the audio data including decoding, amplification, noise filtering, etc. on audio data using the second area 332 of the DRAM 330.

As shown in FIG. 7, when the image display device 100 is powered on, an image may be displayed on the display 120 of the image display device 100. For example, a video included in a broadcast signal received through a tuner may be displayed on a screen, or content (e.g., a video clip) input through the communicator and/or the I/O interface may be displayed. Alternatively, an image stored in the storage may be displayed.

Also, when the first software is loaded onto the first area 331 and run, the image display device 100 may collect sensing data sensed by an IOT device (e.g., state information of the IOT device) and transmit the collected sensing data to the external device 10 as shown in FIG. 7. Here, the external device 10 may be a device or a server which provides a service to a user by using the received sensing data.

The image display device 100 may analyze the collected sensing data and display state information of the IOT devices 30. For example, the state information of the IOT devices 30 may include state information of a robot vacuum cleaner (e.g., charging state and reservation time for cleaning), state information of an air conditioner (e.g., air conditioning state and a desired temperature), state information of a washing machine (e.g., washing state and a washing end time), and state information of an oven (e.g., preheating state and a preheat temperature). Here, the state information of the IOT devices 30 may be displayed in a preset area of the display 120 or in a pop-up window.

Also, the image display device 100 may transmit a control signal to an IOT device 30 based on the collected sensing data. For example, when a room temperature sensed by a temperature sensor of the IOT device 30 is higher than a preset temperature (or a desired room temperature), the image display device 100 may transmit an air conditioner running control signal to an air conditioner, which is an IOT device, to operate the air conditioner. When a room illumination sensed by an illumination sensor is lower than a preset illumination, the image display device 100 may transmit a control signal to turn on an electric light to an electric lighting apparatus, which is an IOT device). When a room humidity sensed by a humidity sensor is higher than a preset humidity, the image display device 100 may transmit a running control signal to the IOT device (e.g., a dehumidifier). However, these are merely examples and cases in which the image display device 100 transmits a control signal to the IOT device 30 are not limited thereto.

Figure 8:
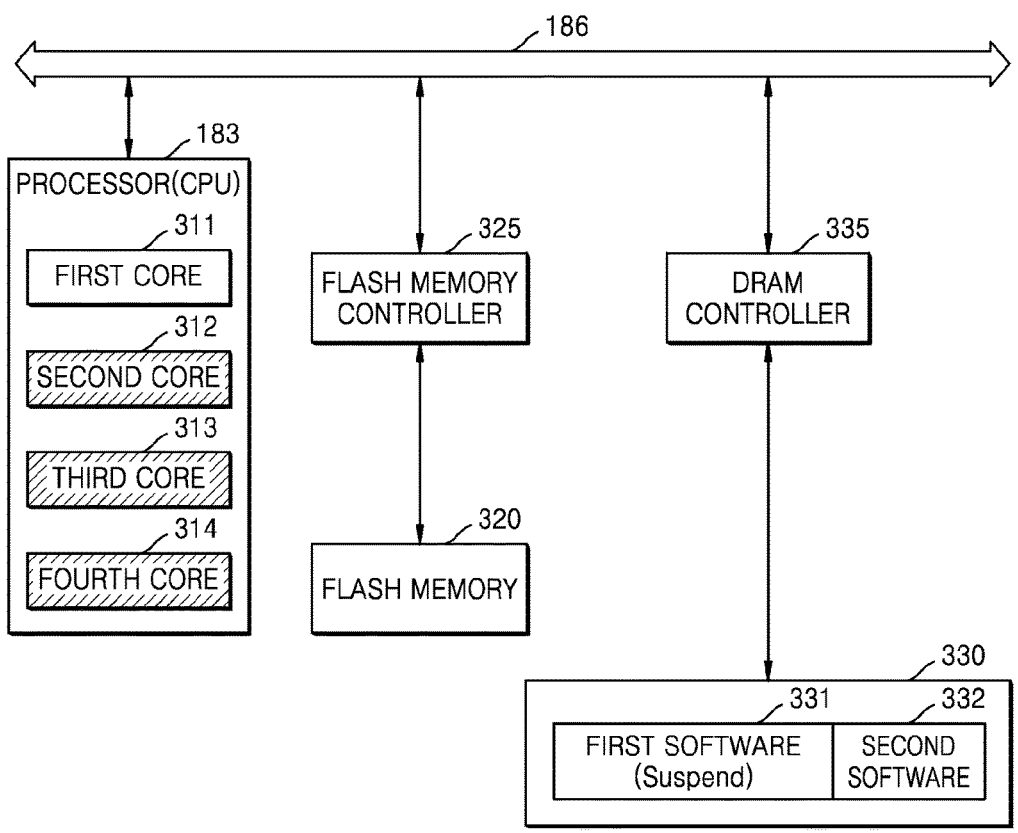
FIGS. 8 and 9 are diagrams illustrating an operating method of an image display device when the image display device is powered off, according to an exemplary embodiment.
Figure 9:
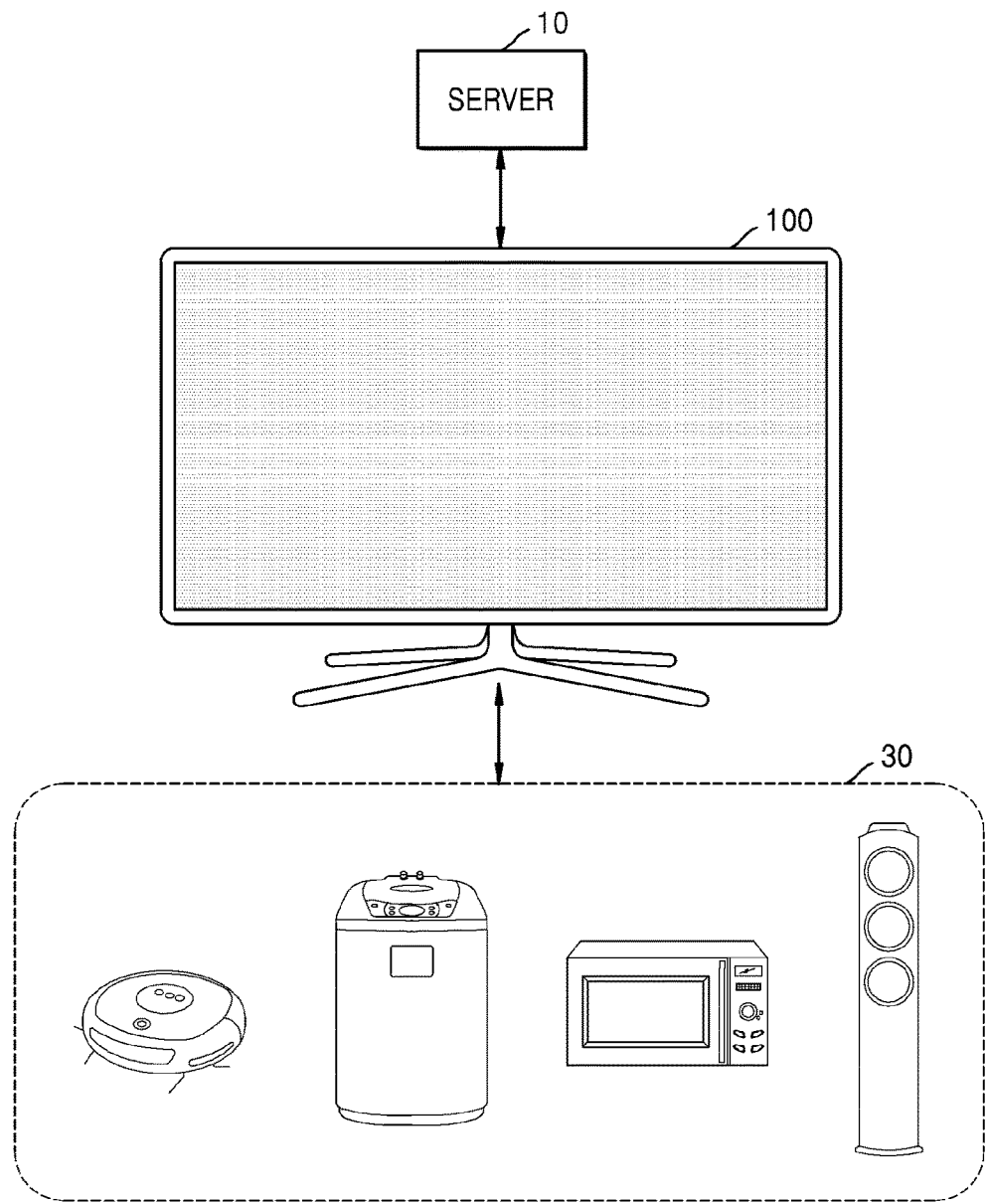

FIGS. 8 and 9 are diagrams illustrating a method of operating an image display device when the image display device is powered off, according to an exemplary embodiment.

Referring to FIG. 8, when a user input of turning off the power of the image display device 100 is received, the processor 183 may stop video data processing that is performed using the second area 332 of the DRAM 330 and transmit a second control signal to the flash memory controller 325. The flash memory controller 325 may read the second software stored in the flash memory 320 in response to the second control signal, and the DRAM controller 335 may control the read second software to be loaded onto the second area 332 of the DRAM 330. However, this is merely an example and the exemplary embodiments are not limited thereto. For example, the processor 183 may transmit the second control signal in response to the image display device 100 entering into a power-off state without receiving a user input (e.g., automatic turn-off timer).

Also, the processor 183 may deactivate the first software loaded onto the first area 331. For example, by suspending the first software, the processor 183 may stop an operation of the first software without ending the first software.

Further, the processor 183 may perform control so that information about network connection (e.g., connection using Bluetooth, Wi-Fi, Zigbee, Z-Wave, etc.) used by the first software is stored in the flash memory 320, a storage area the DRAM 330, or the like.

The processor 183 according to an exemplary embodiment may activate at least one of the plurality of cores and deactivate other cores. For example, the processor 183 may deactivate three (e.g., the second core 312, the third core 313, and the fourth core 314) of the four cores 311-314 and activate only one core (e.g., the first core 311). However, activation and deactivation of cores are not limited to this case. The activated first core 311 may run the second software loaded onto the second area 332. The second software may be software to perform the function of receiving state information of an IOT device from the IOT device and transmitting the received state information to the external server (e.g., the function of receiving sensing data from the IOT device and transmitting the received sensing data to the external server).

When the second software is run, the image display device 100 may receive data (e.g., state information of IOT devices) sensed by the IOT devices (e.g., the robot vacuum cleaner, the washing machine, the oven, the air conditioner, etc.) and transmit the received sensing data to the external device 10 as shown in FIG. 9. Here, the external device 10 may be a device or a server which provides a service to the user by using the received sensing data.

The external device 10 may generate a control signal to control an IOT device based on the sensing data received from the image display device 100. For example, when a room temperature sensed by the temperature sensor of the IOT device) is higher than the preset temperature (or desired room temperature), the external device 10 may generate a control signal to operate the air conditioner, which is an IOT device, and when a room illumination sensed by the illumination sensor is lower than the preset illumination, the external device 10 may generate a control signal to turn on the electric light to the IOT device (e.g., lamp). When a room humidity sensed by the humidity sensor is higher than the preset humidity, the external device 10 may generate a control signal to operate the IOT device (e.g., dehumidifier). However, these are merely examples and cases in which the external device 10 generates a control signal are not limited thereto. The external device 10 may transmit the control signal to the image display device 100, and the image display device 100 may transmit the received control signal to the corresponding IOT device.

The image display device 100 may use stored network connection information (e.g., the network connection information used when the first software was run) to connect to an IOT device through a network and connect to the external device 10 through the network.

The first core 311 may increase a frequency of a core drive signal in a period in which sensing data of an IOT device is collected, and may reduce the frequency of the core drive signal in a period in which sensing data is not collected. Further, the communicator 150 may be activated in a period in which sensing data of an IOT device is collected or the collected data is transmitted to the external device 10, and may be deactivated in a period in which sensing data is not collected.

Also, the first core 311 may store the sensing data of the IOT device (e.g., state information data of the IOT device), etc. in the flash memory 320 or a storage area of the DRAM 330.

As described above, according to exemplary embodiments, when the image display device 100 is powered off, the second software is run by some of the cores (e.g., the first core 311), and thus power consumption of the image display device 100 may be reduced.

When a user input of turning on the power of the image display device 100 is received in a state in which the image display device 100 is powered off, the plurality of cores included in the processor 183 may be activated. For example, the second to fourth cores 312, 313, and 314 may be switched from a deactivated state (or an inactive state) to an active state.

The processor 183 may store information about the network connection (e.g., network connection using Bluetooth, Wi-Fi, Zigbee, Z-Wave, etc.) used by the second software in the flash memory 320, a storage area the DRAM 330, or the like.

Also, when the image display device 100 is turned on, the processor 183 may activate the deactivated first software. For example, the processor 183 may resume the first software and continue to perform the suspended operation of the first software.

The processor 183 may run the resumed first software and perform video data processing, etc. using the second area 332 of the DRAM 330.

The processor 183 may use the stored network connection information (e.g., the network connection information used when the second software was run) when the first software is run. Also, the sensing data of the IOT device (e.g., state information data of the IOT device), etc. stored when the second software is run may be used when the first software is run. For example, the sensing data of the IOT device, etc. may be used for analysis of state information of the IOT device.

Figure 10:
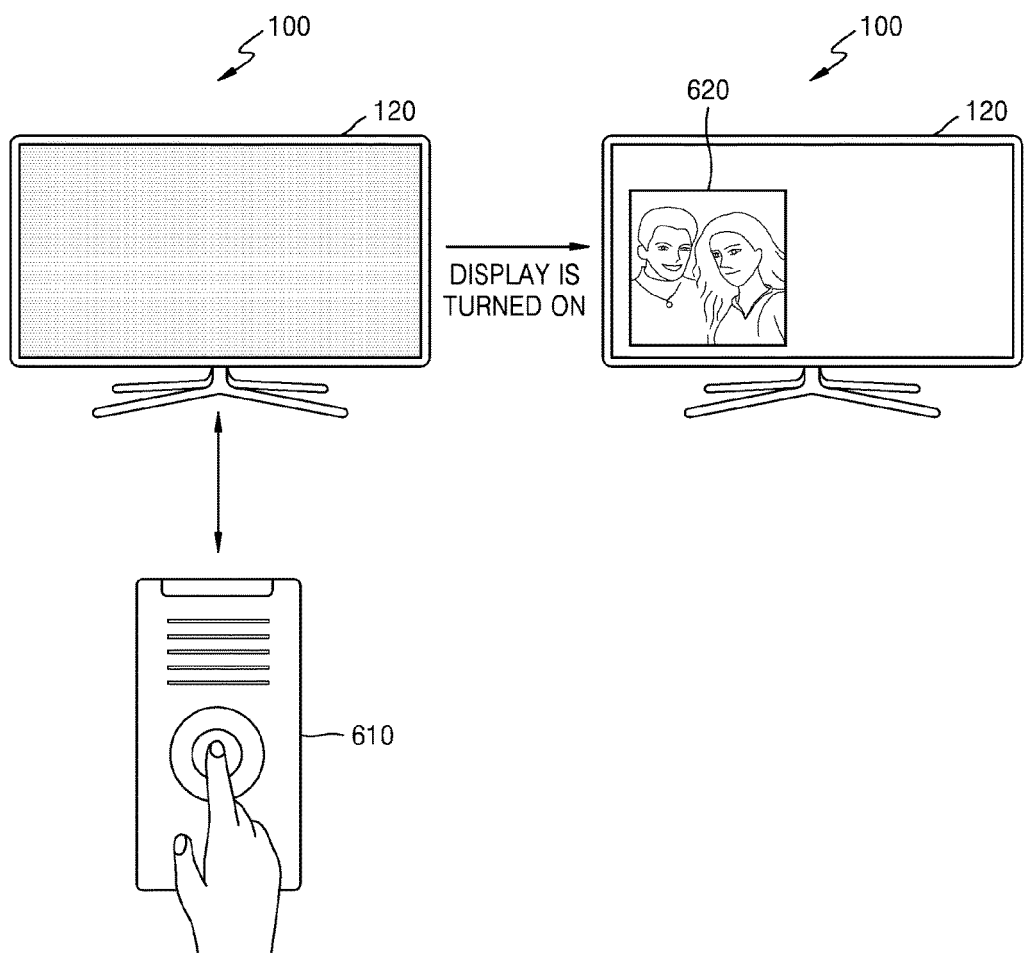
FIG. 10 is a diagram illustrating an operating method of an image display device according to an exemplary embodiment.

FIG. 10 is a diagram illustrating an operating method of an image display device according to an exemplary embodiment.

Referring to FIG. 10, the image display device 100 according to an exemplary embodiment may be in a power-off state. Even in the power-off state, the image display device 100 may receive sensing data (e.g., state information of an IOT device) from an IOT device according to the operating method described with reference to FIG. 8.

For example, when the user pushes a doorbell 610, which is an IOT device, the doorbell 610 may transmit state information of the doorbell 610 (e.g., information indicating that the doorbell 610 has been pushed) to the image display device 100. When the state information of the doorbell 610 is received, the image display device 100 may request an image obtained by capturing surroundings of the door from a camera, which is an IOT device installed in the door. The camera may transmit an image 620 obtained by capturing surroundings of the door to the image display device 100, and the image display device 100 may receive and display the image 620 obtained by capturing surroundings of the door on the display 120 of the image display device 100.

In this case, the image display device 100 may activate cores (e.g., the second to fourth cores 312, 313, and 314) that are in the inactive state, and the activated cores may turn on the display 120 and control the display 120 to display the image obtained by capturing surroundings of the door.

The display 120 may display a message asking whether to release a door lock of the door. When the user inputs an input of requesting that the lock be released through the control device 200, the image display device 100 may transmit a lock-releasing request signal to the door lock of the door to release the door lock. The door lock that receives the lock-releasing request signal may unlock the door.

In another exemplary embodiment, even when the image display device 100 is powered on (e.g., the display 120 is turned on), the state information of the doorbell 610 (e.g., the information indicating that the doorbell was pushed) may be received from the doorbell 610. When the state information of the doorbell 610 is received, the image display device 100 may request an image obtained by capturing surroundings of the door from the camera, which is an IOT device installed in the door. The camera may transmit an image obtained by capturing surroundings of the door to the image display device 100, and the image display device 100 may receive and display the image obtained by capturing surroundings of the door on the display 120.

Figure 11:
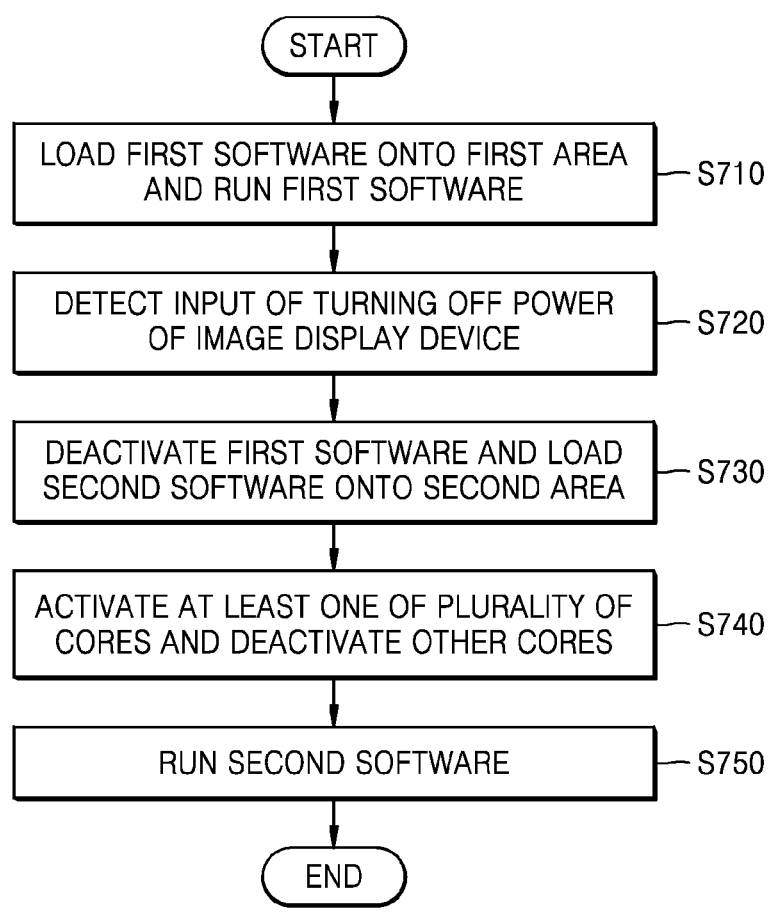
FIG. 11 is a flowchart showing an operating method of an image display device according to an exemplary embodiment.

FIG. 11 is a flowchart showing an operating method of an image display device according to an exemplary embodiment.

Referring to FIG. 11, while the image display device 100 is powered on, the image display device 100 may load the first software onto the first area and run the first software (S710).

The first software and the second software may be stored in the non-volatile memory device of the image display device 100. While the image display device 100 is powered on, the processor 183 may load the first software stored in the non-volatile memory device 141 and run the first software. The first software may be software to perform main functions (e.g., a broadcast receiving function, an image processing function, an image display function, etc.) of an image display device and a function of receiving state information of an IOT device from the IOT device and transmitting the received state information to an external server (e.g., a function of receiving sensing data from the IOT device and transmitting the received sensing data to the external server).

When the first software is run, the image display device 100 may receive a broadcast, process a received broadcast image, and display an image on the display. The image display device 100 may process received video data or audio data using the second area of the volatile memory device 142.

Also, when the first software is run, the image display device 100 may receive sensing data sensed by an IOT device and transmit the received sensing data to an external device.

The image display device 100 may store network connection information thereof, the sensing data received from the IOT device (e.g., state information of the IOT device), etc. in the non-volatile memory device.

The image display device 100 may detect a user input of turning off the power of the image display device 100 (S720).

When a user input of turning off the power of the image display device is detected, the processor 183 may deactivate the first software and load the second software onto the second area of the volatile memory device (S730).

For example, by suspending the first software, the processor 183 may stop an operation of the first software without ending the first software.

The image display device 100 may activate at least one of a plurality of cores and deactivate other cores (S740).

For example, when the processor 183 includes four cores, the processor 183 may deactivate three (e.g., a second core, a third core, and a fourth core) of the four cores and activate only one core (e.g., a first core). However, activation and deactivation of cores are not limited thereto.

The at least one activated core may run the second software (S750).

The second software may be software to perform the function of receiving state information of an IOT device from the IOT device and transmitting the received state information to the external server (e.g., the function of receiving sensing data from the IOT device and transmitting the received sensing data to the external server).

When the second software is run, the image display device 100 may connect to a network using the network connection information stored in the non-volatile memory device.

Also, the image display device 100 may receive data sensed by an IOT device and transmit the received sensing data to the external server 10.

Further, the image display device 100 may store network connection information thereof, sensing data received from an IOT device (e.g., state information of the IOT device), etc. in the non-volatile memory device.

Although it is described in this exemplary embodiment that a user input of turning off the power of the image display device 100 is received, this is only an example and the exemplary embodiments are not limited thereto. For example, the processor 183 may perform operation S740-S760 in response to the image display device 100 entering into a power-off state without receiving a user input (e.g., automatic turn-off timer).

Figure 12:
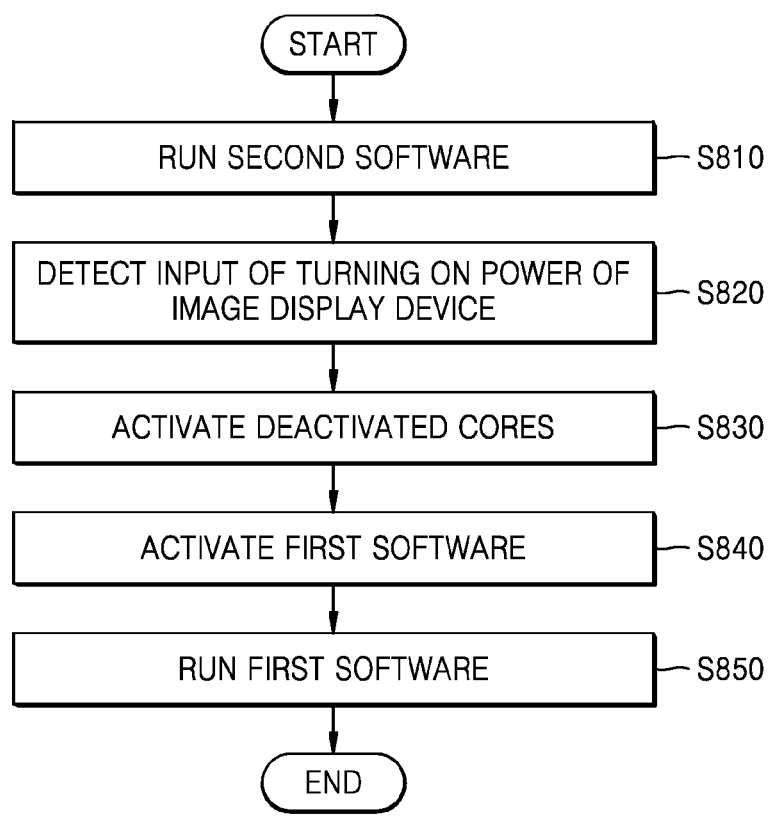
FIG. 12 is a flowchart showing an operating method of an image display device according to an exemplary embodiment.

FIG. 12 is a flowchart showing an operating method of an image display device according to an exemplary embodiment.

Referring to FIG. 12, the image display device 100 may run the second software (S810). Since operation S810 corresponds to operation S750 of FIG. 11, the detailed description thereof will be omitted.

While the second software is running, the image display device 100 may detect a user input of turning on the power of the image display device 100 (S820).

When the user input of turning on the power of the image display device 100 is detected, the image display device 100 may activate deactivated cores (S830).

For example, when three (e.g., a second core, a third core, and a fourth core) of four cores included in the processor are deactivated in a power-off state of the image display device 100, the image display device 100 may activate the three cores.

The image display device 100 may activate the deactivated first software (S840).

For example, the image display device 100 may resume the first software and continue to perform a suspended operation of the first software.

The image display device 100 may run the first software (S850).

Here, a second area onto which the second software has been loaded may be used as a storage area corresponding to processing of received video data or audio data.

Although it is described in this exemplary embodiment that a user input of turning on the power of the image display device 100 is received, this is only an example and the exemplary embodiments are not limited thereto. For example, the processor 183 may perform operation S830-S850 in response to the image display device 100 entering into a power-on state without receiving a user input (e.g., automatic turn-on timer).

As described above, an image display device according to an exemplary embodiment may function as a hub of an IOT system, and a separate IOT hub may not be included in the IOT system.

According to an exemplary embodiment, state information may be received from an IOT device and transmitted to an external device at lower power even in the power-off state of the image display device, and thus power consumption of the image display device may be reduced.

A method of operating an image display device according to an exemplary embodiment may be embodied in the form of program instructions executable by various computing tools and recorded in a computer-readable recording medium. The computer-readable recording medium may include program instructions, data files, data structures, etc., solely or in combination. The program instructions recorded in the computer-readable recording medium may be specially designed or configured for the disclosure, or may be known to and used by those of ordinary skill in the computer software art. Examples of the computer-readable recording medium include magnetic media, such as a hard disk, a floppy disk, and a magnetic tape, optical media, such as a compact disc (CD)-ROM and a digital versatile disc (DVD,) magneto-optical media, such as a floptical disk, and hardware devices, such as a ROM, a RAM, a flash memory, etc., specially configured to store and execute the program instructions. Examples of the program instructions include a high-level language code executable by a computer using an interpreter, etc. as well as a machine language code created by a compiler.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. An apparatus for displaying an image, the apparatus comprising:
a volatile memory;
a non-volatile memory configured to store a first program and a second program; and
a processor configured to load the first program onto a first area of the volatile memory to execute the first program in a power-on state of the apparatus, wherein the first program controls a program for video decoding which is executed in a second area of the volatile memory,
wherein the processor comprises a plurality of cores, and
in a power-off state of the apparatus, the first program and at least one of the plurality of cores of the processor are deactivated, and at least one active core of the plurality of cores load the second program onto the second area of the volatile memory to execute the second program, and
wherein the first program and the second program, when executed, are configured to cause the processor to receive and process state information of an external device.

2. The apparatus of claim 1, wherein the first program controls a program for image processing which is executed in the second area of the volatile memory.

3. The apparatus of claim 1, wherein the first program and the second program, when executed, are further configured to transmit the received state information of the external device to an external server.

4. The apparatus of claim 3, wherein the processor is further configured to perform a control operation of the external device based on at least one of the state information and a control signal from the external server which receives the state information.

5. The apparatus of claim 1, wherein the first program, when executed, is further configured to cause the processor to perform analyzing a state of the external device based on the received state information of the external device and display a result of the analyzing on a display of the apparatus.

6. The apparatus of claim 1, wherein, in response to the power-off state being switched to the power-on state, the at least one of the plurality of cores that is deactivated is activated, and
the processor is further configured to activate the deactivated first program and execute the first program to perform image processing by using the second area of the volatile memory.

7. The apparatus of claim 1, wherein, in the power-on state, the processor is further configured to store information about a network connection of the apparatus in the non-volatile memory, and
in the power-off state, the processor is further configured to connect the apparatus to a network based on the information about the network connection stored in the non-volatile memory.

8. The apparatus of claim 1, wherein the processor is further configured to store, in the non-volatile memory, first state information of the external device received in the power-on state of the apparatus, and
the processor is further configured to store, in the non-volatile memory, second state information of the external device received in the power-off state.

9. The apparatus of claim 8, wherein, in the power-on state, the processor is further configured to perform a control operation of the external device based on at least one of the first state information and the second state information.

10. A method of operating an electronic apparatus, the method comprising:
in a power-on state of the electronic apparatus, loading, by a processor comprising a plurality of cores, a first program onto a first area of a volatile memory to be executed, wherein the first program controls a program for video decoding which is executed in a second area of the volatile memory; and
in a power-off state of the electronic apparatus, deactivating the first program and at least one of the plurality of cores, and loading a second program, by at least one active core of the plurality of cores, onto the second area of the volatile memory to be executed,
wherein the first program and the second program, when executed, are configured to cause the processor to receive state information of an external device.

11. The method of claim 10, wherein the first program controls a program for image processing which is executed in the second area of the volatile memory.

12. The method of claim 10, wherein the first program and the second program, when executed, are further configured to cause the processor to transmit the received state information of the external device to an external server.

13. The method of claim 10, wherein the first program, when executed, is further configured to cause the processor to perform analyzing a state of the external device based on the received state information of the external device and displaying a result of the analyzing.

14. The method of claim 10, further comprising, in response to the power-off state being switched to the power-on state:
activating the at least one of the plurality of cores that is deactivated;
activating the deactivated first program; and
executing the first program to perform image processing by using the second area of the volatile memory.

15. The method of claim 10, further comprising:
in the power-on state, storing, in a non-volatile memory, information about a network connection of the electronic apparatus, and in the power-off state, connecting the electronic apparatus to a network based on the information about the network connection stored in the non-volatile memory.

16. The method of claim 10, further comprising:
storing first state information of the external device received in the power-on state in a non-volatile memory, and
storing second state information of the external device received in the power-off state in the non-volatile memory.

17. The method of claim 16, further comprising analyzing a state of the external device based on at least one of the first state information and the second state information and displaying a result of the analyzing.

18. An electronic apparatus comprising:
at least one memory configured to store a program;
at least one processor configured to read the program and operate as instructed by the program, the program including:
a first program configured to cause the at least one processor to receive state information from an external device and perform a control operation of the external device based on the state information, wherein the first program is loaded onto a first area of a volatile memory, and the first program controls a program for video decoding which is executed in a second area of the volatile memory; and
a second program configured to cause the at least one processor to receive the state information from the external device, the first program and the second program being stored in different regions of the at least one memory,
wherein the at least one processor is configured to execute the first program in a power-on state of the electronic apparatus and execute the second program in a power-off state of the electronic apparatus,
wherein the at least one processor comprises a plurality of cores, the first program and at least one of the plurality of cores are deactivated in the power-off state, and
wherein at least one active core of the plurality of cores load the second program onto the second area of the volatile memory to execute the second program.

* * * * *